United States Patent
O'Brien et al.

(10) Patent No.: US 10,424,130 B2
(45) Date of Patent: Sep. 24, 2019

(54) SYSTEM AND METHODS FOR DRONE-BASED VEHICLE STATUS DETERMINATION

(71) Applicant: Walmart Apollo, LLC, Bentonville, AR (US)

(72) Inventors: John Jeremiah O'Brien, Farmington, AR (US); Donald High, Noel, MO (US); Chandrashekar Natarajan, San Ramon, CA (US); Nathan Glenn Jones, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 11 days.

(21) Appl. No.: 15/723,858

(22) Filed: Oct. 3, 2017

(65) Prior Publication Data
US 2018/0096541 A1  Apr. 5, 2018

Related U.S. Application Data

(60) Provisional application No. 62/403,971, filed on Oct. 4, 2016.

(51) Int. Cl.
| | |
|---|---|
| G07C 5/00 | (2006.01) |
| G05D 1/00 | (2006.01) |
| G06K 9/00 | (2006.01) |
| G06Q 50/28 | (2012.01) |
| B60R 25/30 | (2013.01) |
| B64C 39/02 | (2006.01) |

(52) U.S. Cl.
CPC .......... *G07C 5/008* (2013.01); *G05D 1/0088* (2013.01); *G05D 1/0094* (2013.01); *G06K 9/00637* (2013.01); *G06Q 50/28* (2013.01); *B60R 25/305* (2013.01); *B64C 39/024* (2013.01); *B64C 2201/123* (2013.01); *B64C 2201/127* (2013.01); *G06K 9/00744* (2013.01)

(58) Field of Classification Search
CPC .. G07C 5/008; G05D 1/0088; G06K 9/00637; G06Q 50/28
USPC .......................................................... 701/29
See application file for complete search history.

(56) References Cited

U.S. PATENT DOCUMENTS

| | | | |
|---|---|---|---|
| 8,989,922 B2 | 3/2015 | Jones et al. | |
| 9,033,116 B2 * | 5/2015 | Breed .................... | B60T 1/005 188/68 |
| 9,035,774 B2 | 5/2015 | Scott et al. | |
| 9,164,506 B1 * | 10/2015 | Zang .................... | G05D 1/0038 |
| 9,280,757 B2 | 3/2016 | Parpia et al. | |
| 2010/0250022 A1 | 9/2010 | Hines et al. | |

(Continued)

OTHER PUBLICATIONS

Using Drones and RFID to Track Inventory at AUVSI 2016, YouTube, last viewed Oct. 3, 2017.

(Continued)

*Primary Examiner* — Yazan A Soofi
(74) *Attorney, Agent, or Firm* — McCarter & English, LLP; David R. Burns

(57) ABSTRACT

Exemplary embodiments relate to a drone system including a drone configured for navigation of an outdoor facility and equipped with an RFID reader, an optical code reader, and at least one of powertrain control module data receiver and an electronic control module data receiver. The system includes a computing system in communication with the drone.

16 Claims, 7 Drawing Sheets

(56) References Cited

U.S. PATENT DOCUMENTS

| | | | |
|---|---|---|---|
| 2014/0306799 A1 | 10/2014 | Ricci | |
| 2014/0354809 A1* | 12/2014 | Shondel | G06Q 10/087 348/144 |
| 2016/0039436 A1* | 2/2016 | Bhagwatkar | B64C 39/024 348/148 |
| 2016/0078759 A1* | 3/2016 | Nerayoff | G06Q 20/145 701/3 |
| 2016/0247115 A1 | 8/2016 | Pons | |
| 2016/0247116 A1 | 8/2016 | Olivo et al. | |
| 2016/0282872 A1* | 9/2016 | Ahmed | B64C 39/024 |

OTHER PUBLICATIONS

Using Drones and RFID to Track Construction Inventory and People Tracking, YouTube, last viewed Oct. 3, 2017.

DJI—Introducing the Matrice 600, YouTube, last viewed Oct. 3, 2017.

DroneScan as a solution, http://www.dronescan.co/, May 12, 2016.

Morlin-Yron, Sophie, Are flying robots the perfect co-workers?, http://edition.cnn.com/2016/05/12/africa/drone-scan-inventory-technology-south-africa/index.html, viewed Aug. 17, 2017.

Ackerman, Evan, Flying Inventory Assistant Are a Good Use for Drones, IEEE Spectrum, http://spectrum.ieee.org/automaton/robotics/drones/flying-inventory-assistants-are-a-good-use-for-drones, last viewed Aug. 18, 2017.

InventAIRy—Identifikation mit autonomen Flugrobotern, https://www.youtube.com/watch?v=Ssbl4Ge7Bnk, YouTube, last viewed Oct. 3, 2017.

Supply Chain Management—Be ready for the drone invasion @ warehouse, http://www.infosysblogs.com/supply-chain/2016/07/be_ready_for_the_drone_invasion.html, viewed Aug. 18, 2017.

Heater, Brian, Keeping track of warehouse inventories with an army of fully autonomous drones, https://techcrunch.com/2016/09/12/intelligent-flying-machines/, Disrupt SF 2016, Pier 48, San Francisco, Sep. 12, 2016.

Eyesee, the inventory-taking drone, YouTube, https://www.youtube.com/watch?v=R1qtwoPde0U, viewed Oct. 3, 2017.

International Search report and Written Opinion for PCT/US2017/054921 dated Dec. 12, 2017, pp. 1-16.

* cited by examiner

SYSTEM AND METHODS FOR DRONE-BASED VEHICLE STATUS DETERMINATION

CROSS-REFERENCE TO RELATED PATENT APPLICATIONS

This application claims priority to U.S. Provisional Application No. 62/403,971 filed on Oct. 4, 2016, the content of which is hereby incorporated by reference in its entirety.

BACKGROUND

Many products are transported using trucks and trailers. Between transportation runs, the trucks and trailers sit in a yard or outdoor facility where the trucks and trailers are parked. Conventionally, checking the status of the trucks and trailers requires the assignment of company employees to manually verify their status.

Drones are robotic devices that may function autonomously without direct user control or alternatively may be directly controlled by users. Drones may be aerial vehicles, may be land-based vehicles and/or may function in underwater environments. Autonomous aerial drones may navigate outdoor areas without user participation during flight.

BRIEF DESCRIPTION OF DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DESCRIPTION OF EXEMPLARY EMBODIMENTS

Figure 1:
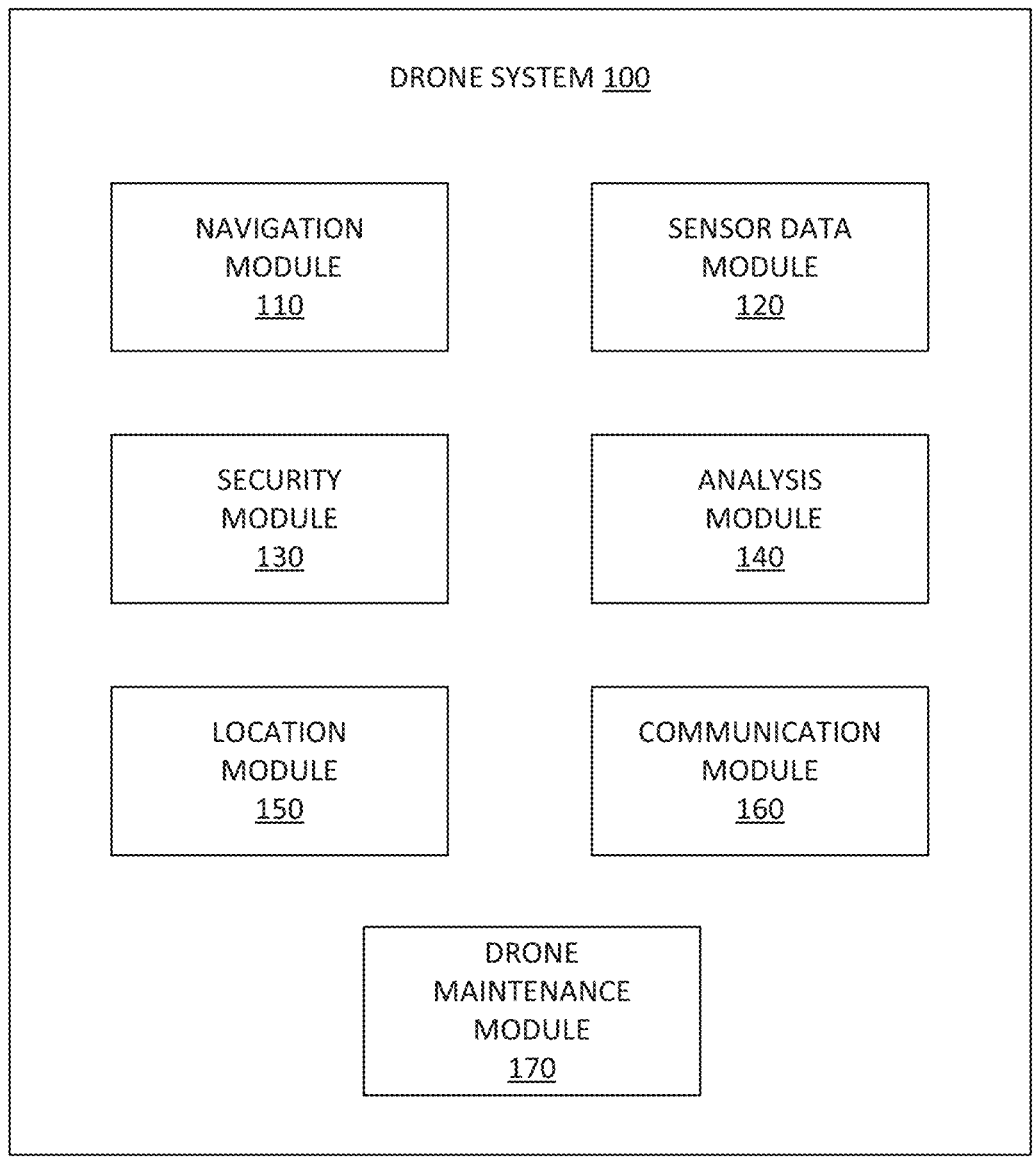
FIG. 1 is a block diagram showing an drone system implemented in modules, according to an example embodiment.

Maintaining accurate records of trucks and trailers parked in an outdoor yard facility is a time consuming process involving many hours of labor that is subject to inaccuracies by the personnel. There are often moving trucks and trailers in the yard or dock. Additionally, it is dangerous for personnel to walk the yard or dock among large trucks and trailers to determine status. One alternative to the use of personnel traversing the yard or dock to perform status checks is to use a drone in place of the personnel. Using a drone to perform tasks may result in higher efficiency and lower costs. Embodiments of the present invention provide a drone system and a drone configured for navigation of an outdoor facility that scans identifiers of the trucks and trailers to determine location of individual trucks and trailers, and checks the powertrain control module (PCM) or electronic control module (ECM) of the trucks for error codes to help determine status.

Embodiments described herein enable drones to function in a system for maintaining records of truck and trailer status in a yard or other location where trucks and trailers may be parked. Further, in one embodiment, the drones may be configured to check for security breaches by visual recognition of security strips and seals. The drone system may also be used in determining if any potential issues are present with the truck or trailer, such as a flat tire, physical damage to the frame, PCM/ECM error code recognition, and the like. The drone system can also check if any truck or trailer has been parked in the yard longer than desirable.

In one embodiment, trucks and trailers at an outdoor facility may be tagged with tagging devices, such as RFID tags, as well as name & number designators readable using Optical Character Recognition (OCR). The drones may be fitted with visual detection systems, such as video and image capture devices to acquire images for visual analytics so as to determine if security seals are broken on a given truck or trailer. In one embodiment, the images and video captured by the drones may be programmatically or manually analyzed to determine if a trailer or truck has been damaged.

In one embodiment, drones are fitted with a wireless ECM/PCM data receiver system for receiving information from the truck's ECM/PCM device such as error codes and diagnostic information. The drone can transmit this information to a computing system for proactive actions when a truck or trailer has registered an error.

In one embodiment, to ensure the safety of the personnel and the equipment in the field the drone may operate on a "grappling line." This line may be connected between multiple "telephone-like" poles, where the drone is attached to the line. The use of the grappling line may lessen the risk posed by a malfunctioning and falling drone.

In one embodiment a drone may receive waypoints in advance for optimal navigation. For example, a separate computing system may supply the waypoints to a navigation module on the drone that may use the waypoints as interim markers to guide the drone while flying around the yard or other outdoor facility. Further, in an embodiment, the drone may be equipped with, an exception handling system to allow the drone to make decisions when unforeseen events have been noticed by the drone in the yard, such as damage to a security seal, damage to a trailer, error in truck or trailer count, and the like.

Described in detail herein are systems and methods for a drone system. The drone system can be used to check the status and location of trucks and trailers at outdoor facilities such as yards or docks. In one embodiment, a drone is configured to navigate an outdoor facility and read an RFID tag and optical code affixed to a truck or trailer. The drone is also configured with a receiver to receives data from a power control module (PCM) or engine control module (ECM) installed in a truck. PCMs and ECMs are described further below. The drone may transmit the read data to a separate computing system for further analysis. For example, the drone system may use the read RFID and optical code data along with the location of the drone when the data was gathered to verify the location of the truck or trailer as being consistent or inconsistent with an assigned location for the truck or trailer. The PCM or ECM data received from the drone may provide insight into a current status of the truck or trailer based on an error code or diagnostic code.

A power-train control module, abbreviated PCM, is an automotive component, a control unit, used on motor vehicles. It is generally a combined control unit, consisting of the engine control unit and the transmission control unit. The PCM may also be known as an engine control module (ECM). The PCM or ECM commonly controls more than 100 factors in a car or truck. There are many error or diagnostic codes that can occur, which indicates that some subsection of the vehicle is experiencing a problem. The PCM or ECM is one of potentially several on-board computers, and essentially functions as the "brain" of the vehicle's control system. The primary inputs to the PCM come from many sensors, of different types, that are spread around the vehicle. Most of them are oriented toward engine management and performance.

As used herein, "drone" refers to an unmanned aerial or ground vehicle. The drone may be a commercially available drone capable of performing the functionalities described herein. The drone may be capable of autonomous flight, may be aware of its surroundings, and may be programmable. The drone may be coupled to one or more sensors or devices that enable aid in performance of the functionalities described herein. The sensors or devices include, but are not limited to, RFID reader, an optical code reader, an image capture device for acquiring still images or video, a motion sensor, a distance sensor, an infrared sensor, a thermal sensor, location sensors, and the like. The drone may also include a processing device or an on-board computing device and memory to store instructions or data, and communication ability to communicate with one or more external computing systems including a computational device (hosting a command center), a server or other drones.

As used herein, "optical machine-readable label" or "optical machine-readable identifier" refers to a code printed on a label that is readable by an optical code reader or device. The code includes, but is not limited to, a barcode, 2D or matrix barcodes, quick response (QR) code, and the like.

FIG. 1 is a block diagram showing a drone system 100 in terms of functional modules according to an example embodiment. The modules may include a navigation module 110, a sensor data module 120, a security module 130, an analysis module 140, a location module 150, a communication module 160, and a drone maintenance module 170. One or more of the modules of system 100 may be implemented in drone 510, device 520 or server 530 of FIG. 5. The modules may include various circuits, circuitry and one or more software components, programs, applications, or other units of code base or instructions configured to be executed by one or more processors included in drone 510, device 520 or server 530. Although modules 110, 120, 130, 140, 150, 160, 170 are shown as distinct modules in FIG. 1, it should be understood that modules 110, 120, 130, 140, 150, 160 and 170 may be implemented as fewer or more modules than illustrated. It should be understood that modules 110, 120, 130, 140, 150, 160 and 170 may communicate with one or more components included in system 500 (FIG. 5), such as drone 510, device 520, server 530 or database(s) 540.

The navigation module 110 may be configured to analyze and manage a route for navigation by a drone at an outdoor facility. The navigation module 110 may also be responsible for dynamically navigating the drone when obstacles are detected. The navigation module 110 may cause the drone to operate its one or more sensors or devices to enable safe navigation around the outdoor facility or yard by acquiring location data needed for the drone to track its current location. Further, the navigation module 110 may cause the drone to operate an RFID reader coupled to the drone and an optical code reader coupled to the drone to read or scan identifiers associated with trucks and trailers in an outdoor facility. In an example embodiment, the navigation module 110 may be included in the drone (e.g., drone 510).

In some embodiments, the navigation module 110 can implement one or more of the following for location awareness and to assist in navigations: Ultra Wide Band communication, sound-echo location through sonar, radar, LED lights, artifacts (e.g.: images and symbols), color-coded fixed locations visible to drone (e.g. pipes, lanes, etc.), OCR recognition, track recognition (for forklifts), Wi-Fi, Auto CAD, virtual mapping, Simultaneous Localization and Mapping (SLAM), Flash LIDAR, HD Camera, infrared, thermal detection (e.g.: heat signatures), triangulation (beacons and signaling equipment) side and top mounted laser altimeters (providing horizontal and vertical measurement) and/or a GPS repeater.

The sensor data module 120 may be configured to manage and analyze data sensed by one or more sensors coupled to the drone. The data sensed by the sensors may include location data, obstacle identification data, truck or trailer identifier data, RFID tag data, PCM/ECM data, images, video, and the like. In an example embodiment, the sensor data module 120 is included in the drone (e.g., drone 510). In another embodiment, the sensor data module 120 is included in the computational device (e.g., device 520) or the server (e.g., sever 530).

The security module 130 may be configured to manage and analyze sensed data for security issues. For example, the security module 130 may perform video analytics on images or video captured by the drone to determine if a security seal on the truck or trailer has been tampered with by an unauthorized individual. In another embodiment, the security seal may include a sensor that automatically transmits data that may be received by the drone and to indicate that the security seal was tampered with by an unauthorized individual.

The analysis module 140 may be configured to analyze data sensed or scanned by the drone. For example, the analysis module 140 may be configured to process the identifiers and location data acquired by the drone that are associated with a selected truck or selected trailer in order to verify an assigned location for the selected truck and the selected trailer. The analysis module 140 may also analyze data received from a PCM or an ECM installed in a selected truck or trailer to determine if the PCM or ECM is transmitting an error code or other diagnostic information that requires action. In an example embodiment, the analysis module 140 is included in the drone (e.g., drone 510). In another embodiment, the analysis module 140 is included in a separate computational device or computing system (e.g., device 520) or the server (e.g., sever 530).

The location module 150 may be configured to manage and analyze location data sensed by the drone. In some embodiments, the location module 150 is included at the drone. In other embodiments, the location module 150 is included in a separate computational device or computing system (e.g., a computing device hosting a command center) or a server.

The communication module 160 may be configured to facilitate communication between the drone and the a separate computational device or computing system, and/or to facilitate communications between the drone and other drones. In an example embodiment, the communication module 160 is included in the drone (e.g., drone 510). The drone maintenance module 170 may be configured to analyze components of the drone to determine if maintenance is required, including charging of batteries, repair of tools or components, update of software, and the like. The drone maintenance module 170 may instruct the drone to navigate to a docking or charging station when the drone power is low or when the drone requires maintenance. In an example embodiment, the drone maintenance module 170 is included in the drone (e.g., drone 510).

Figure 2:
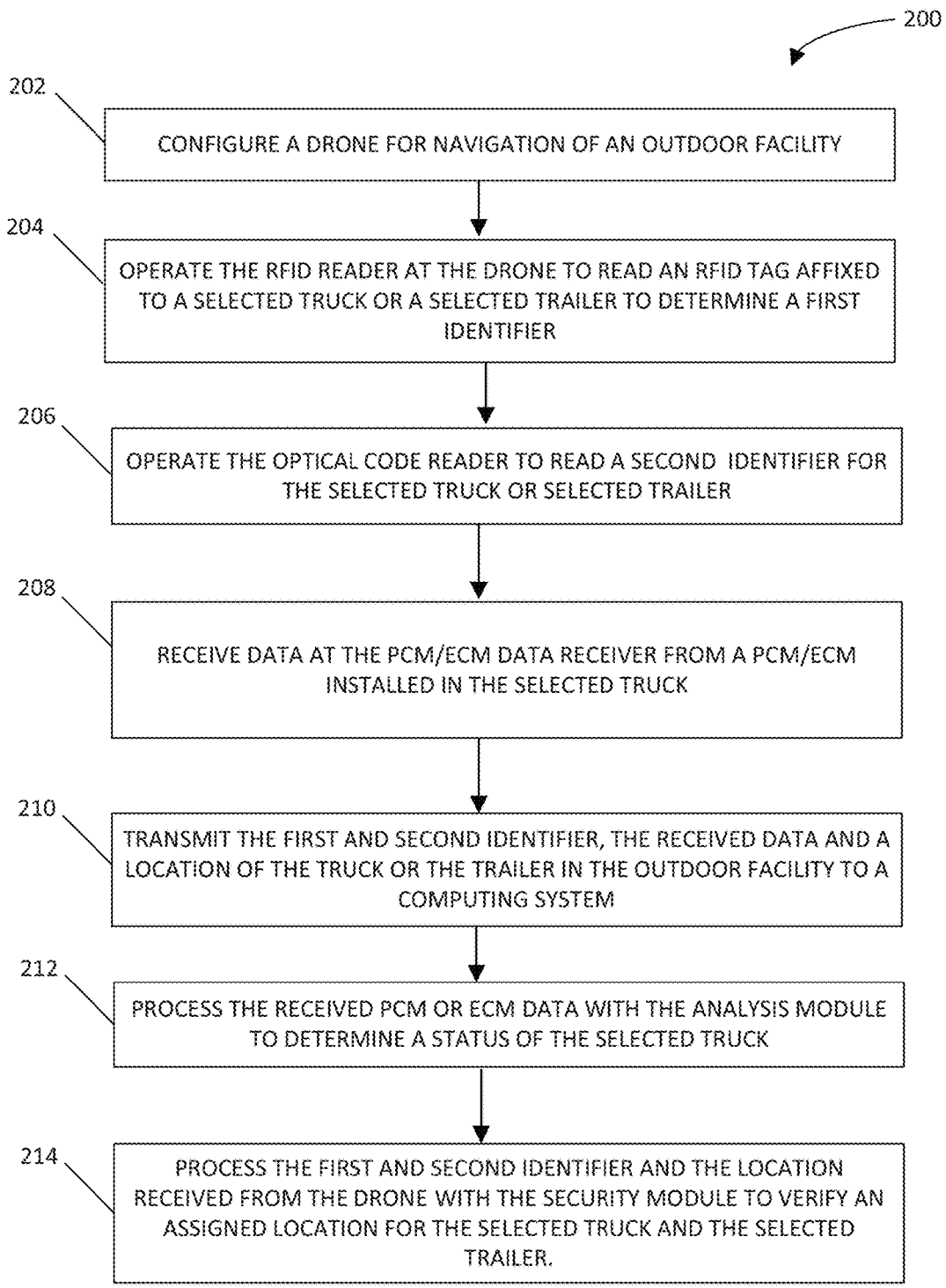
FIG. 2 is a flowchart showing an exemplary method for navigating a drone, according to an example embodiment.

FIG. 2 is a flowchart showing an exemplary method 200 for navigating a drone around an outdoor facility or yard containing trucks and trailers, according to an example embodiment. The steps of method 200 may be performed by one or more modules shown in FIG. 1. It will be appreciated that the method may be programmatically performed by one or more computer-executable processes executing on, or in communication with, one or more computing systems or processors described further below.

At step 202, the navigation module 110 executes to navigate the drone through an outdoor facility. The drone is equipped with an RFID reader, an optical code reader, and at least one of a PCM data receiver and an ECM data receiver. The navigation module 110 may provide an optimized route for the drone to navigate through the outdoor facility. The optimized route may be based on a route that requires the drone to navigate by each truck or trailer in the outdoor facility. The drone may deviate from the route when the drone detects a predefined event. For example, the drone may detect an event such as, an obstacle, a break in a security seal, damage to truck or trailer, and the like. In an example embodiment, the drone is coupled to an image capturing device.

At step 204, the navigation module 110 operates the RFID reader on the drone to read an RFID tag affixed to a selected truck or selected trailer to determine a first identifier.

At step 206, the navigation module 110 operate the optical code reader to read a second identifier for the selected truck or selected trailer. Text may be affixed to the top surface or side surface of the truck or trailer, and the drone performs OCR on the text to determine the second identifier. An optical machine-readable label may be affixed to the top surface or side surface, and the drone reads the label to determine the second identifier.

In an example embodiment, the navigation module 110 causes the drone to execute the image capturing device to obtain images of a security seal on the selected truck or selected trailer. The drone applies video analytics to the images to detect a break of the security seal or may send the images to a separate computing system for the video analytics to be performed. In another embodiment, the drone receives data transmitted from a sensor indicating a break in the security seal at the selected truck or selected trailer.

At step 208, the sensor data module 120 receives data at the PCM data receiver from a PCM installed in the selected truck. The sensor data module 120 may also receive data at the ECM data receiver from an ECM installed in the selected truck.

At step 210, the sensor data module 120 transmits the first and second identifier, the received PCM or ECM data and a location of the selected truck or selected trailer in the outdoor facility to a computing system. The computing system is in communication with the drone and is configured to execute the security module 130 and the analysis module 140.

At step 212, the analysis module 140 processes the received PCM or ECM data to determine a status of the selected truck.

In an example embodiment, the analysis module 140 applies video analytics to the images captured by the drone to detect a break of the security seal.

At step 214, the security module 130 processes the first and second identifier and the location received from the drone to verify an assigned location for the selected truck or the selected trailer.

In an example embodiment, the method 200 may also include retrieving an initial time at which an identified truck or an identified trailer arrived at a current location in the outdoor facility. Then a current time for the identified truck or the identified trailer at the current location is identified to determine an elapsed parked time for the identified truck or the identified trailer at the current location. An alert is transmitted to the computing system when the elapsed parked time is greater than a pre-determined threshold. For example, this analysis may be used to identify a truck or trailer that has been sitting in an outdoor yard for a length of time that exceeds an optimal wait time.

In one embodiment, the location module 150 determines the drone's current location in the outdoor facility. The drone may be coupled to a global positioning system to enable identification of the drone's location. In another embodiment, the location module 150 determines the location of the selected truck or selected trailer in the outdoor facility using data read from sensors coupled to the truck or trailer.

In an example embodiment, the drone system 100 generates a notification if damage to the truck or trailer is detected. The damage may be detected using video analytics of the images captured by the drone. The notification may be transmitted to an individual for further action or may be logged in a database.

Figure 3:
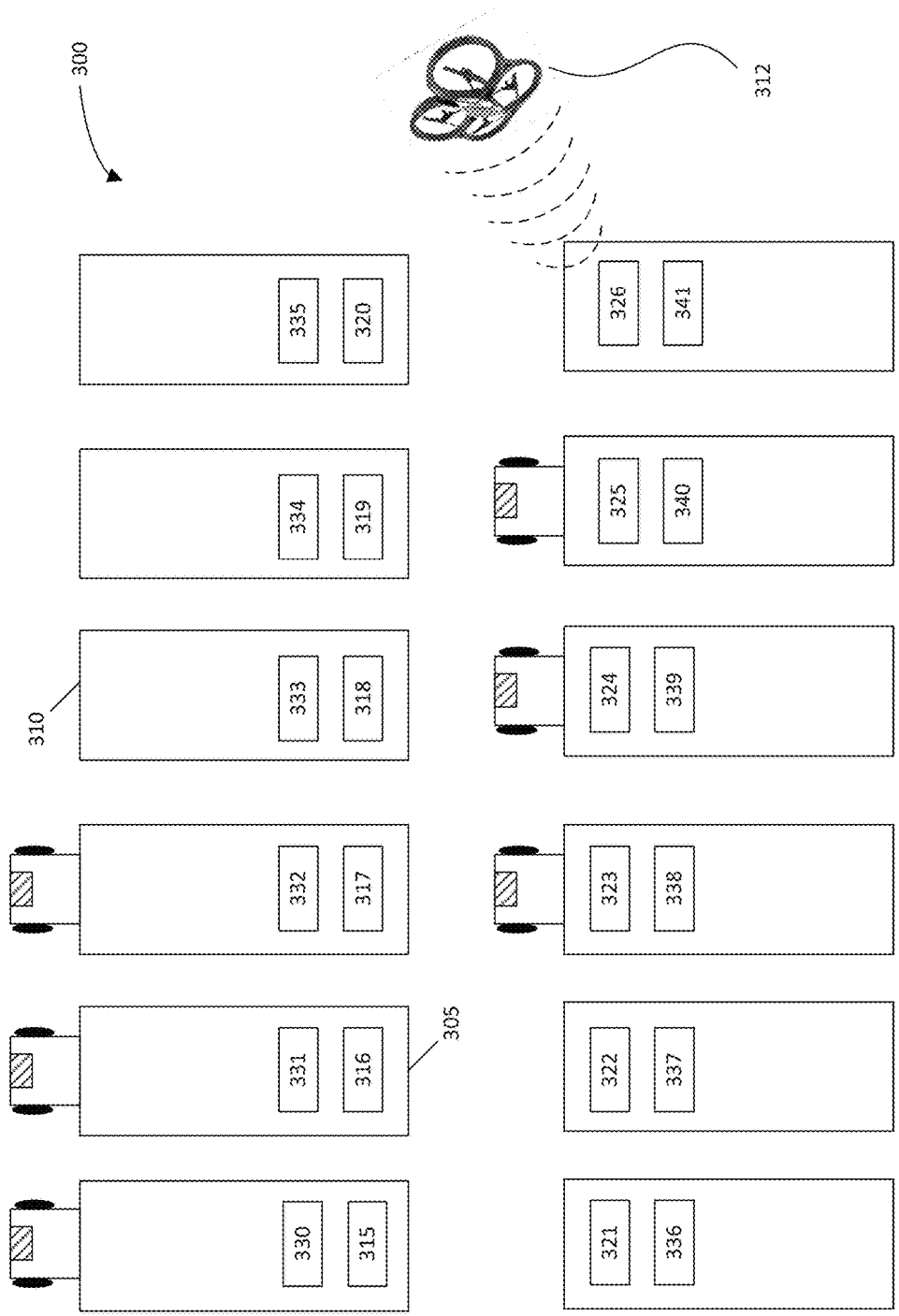
FIG. 3 is a schematic showing an exemplary outdoor facility housing multiple trucks and trailers, according to an example embodiment.

FIG. 3 is a schematic showing an exemplary outdoor facility 300 housing multiple trucks 305 and trailers 310, according to an example embodiment. As shown, each truck and trailer includes an RFID tag 315-326 that uniquely identifies the truck or trailer. Each truck and trailer also includes an optical code 330-341 that uniquely identifies the truck or trailer. The drone 312 reads the RFID tag for a selected trailer or truck (e.g., RFID tag 326), and scans an optical code for the selected trailer or truck (e.g., optical code 341).

Figure 4A:
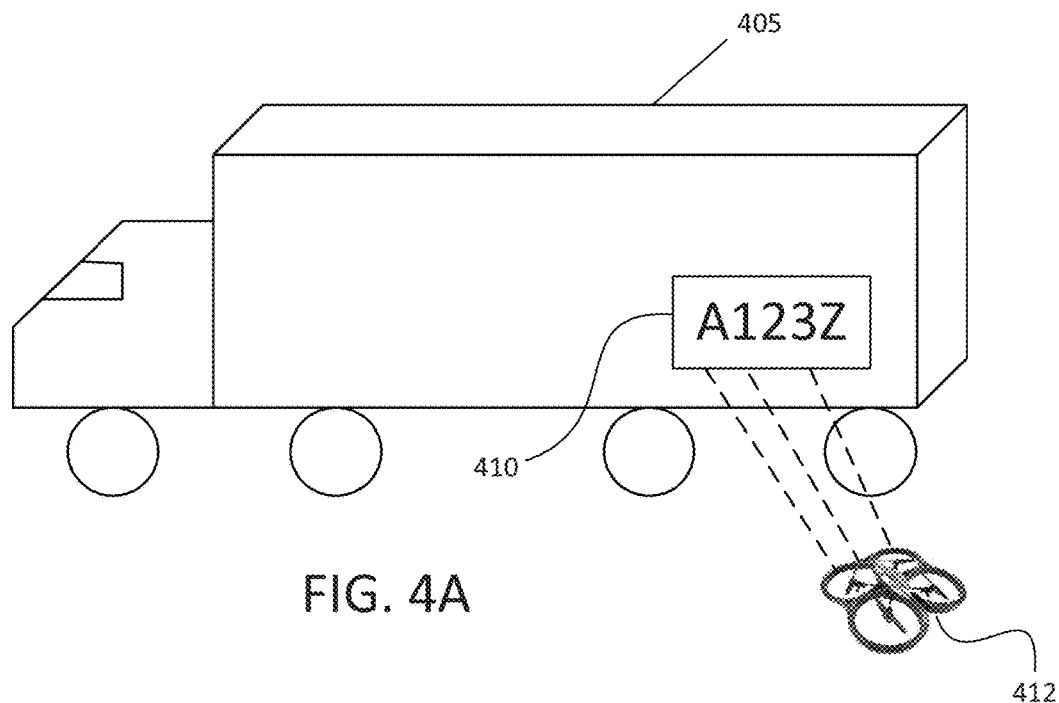
FIG. 4A is a schematic showing an exemplary truck with an identifier, according to an example embodiment.

FIG. 4A is a schematic showing an exemplary truck 406 with an identifier 410, according to an example embodiment. As shown, the truck 406 is affixed with an identifier 410 that includes text that can be scanned by drone 412. The drone 412 may perform optical character recognition (OCR) on the scanned text to determine the identifier for the selected truck 406. In other embodiments, the identifier 410 may be an optical machine readable code.

Figure 4B:
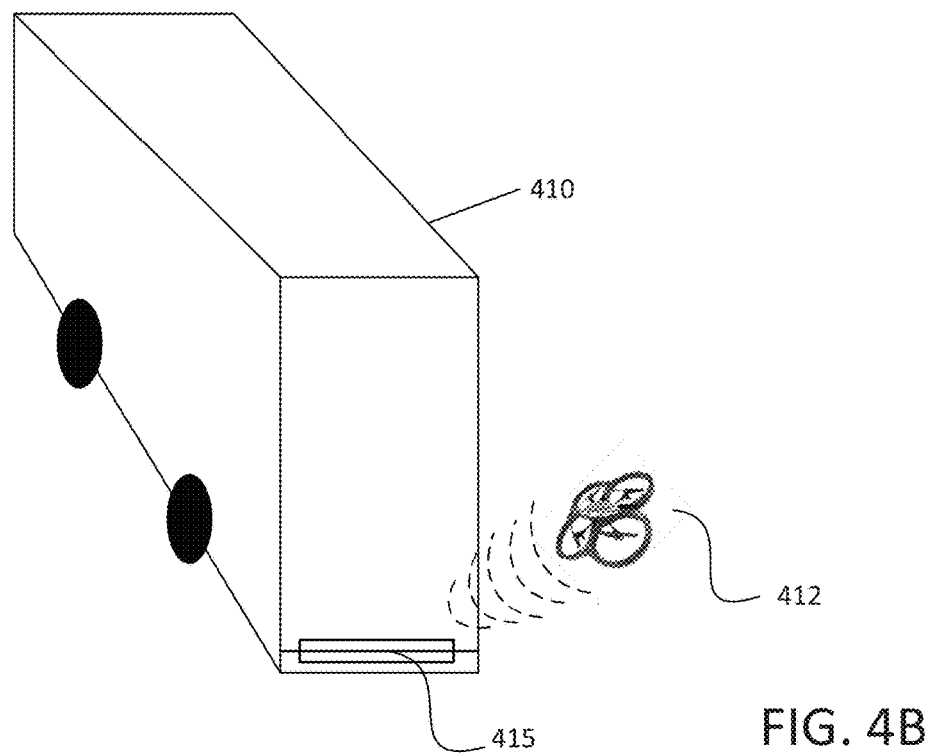
FIG. 4B is a schematic showing an exemplary trailer with a security seal, according to an example embodiment.

FIG. 4B is a schematic showing an exemplary trailer 410 with a security seal 415, according to an example embodiment. As shown, the trailer 410 includes the security seal 415. The drone 412 scans the security seal 415 to determine if the seal has been tampered or broken. The drone 412 may capture images of the security seal 415 and video analytics may be performed on the seal to determine its condition. In other embodiments, the security seal 415 may include a sensor that transmits data indicating the security seal 415 is broken.

Navigation

The drone may be capable of navigating a route autonomously without further instructions from a user. The drone may be provided with a route to navigate the outdoor facility. The route may be optimized based on obstacles and human traffic within the outdoor facility.

The drone may be capable of geolocation awareness. The drone may also be capable of detecting various objects at the outdoor facility. For example, the drone is also capable of detecting waypoint markers on its route. Waypoint markers may be established at a predetermined locations at the outdoor facility. The drone may also be capable of detecting docking or charging stations and landmarks at the outdoor facility.

Even though the drone may be instructed to navigate an optimized route, the drone may also be capable of making decisions autonomously. The drone may include artificial intelligence for making autonomous decisions to sense and avoid dynamic and static obstacles. The drone may also dynamically optimize the predefined route based on sensed data during its route navigation. The drone may be programmed to tolerate certain exceptions dynamically during its autonomous navigation of the outdoor facility.

In an example embodiment, the drone may dynamically navigate the outdoor facility by vertically or horizontally rerouting to avoid obstacles. In some cases, the drone may return to a base station and wait for certain dynamic obstacles to clear. In another embodiment, the drone may statically navigate around obstacles by communicating data related to the sensed obstacles to a command center device. The command center device may dynamically transmit instructions to the drone to navigate around obstacles.

Sense and Avoid

In an example embodiment, the drone may be configured to identify obstacles during autonomous navigation. The drone may identify obstacles at the outdoor facility such as other drones, personnel, power lines, and the like. In one embodiment, the drone is equipped with sensors or devices that allows it to sense and identify objects located above the drone, below the drone, and on either side of the drone. The drone may also be capable of sensing and determining how far away an object is located. In an example embodiment, the drone is capable of determining which direction a dynamic object (for example, other drones, equipment, forklifts, etc.) is traveling. The drone may also be configured to determine the speed of the object. Using the sensed data, the drone may be capable of differentiating between objects. For example, the drone may be able to differentiate between personnel, equipment, other drones, and the like.

Autonomous Docking Station

To aid in autonomous functioning of the drone, the drone may be configured to autonomously navigate to a docking station as required. A docking station may be referred to herein as a base station, home base, charging station, and the like. The drone may autonomously navigate to a docking station for refueling or charging its batteries. In case the drone requires maintenance, the drone may also autonomously navigate to the docking station. The drone may autonomously determine that it requires maintenance based on data sensed by the drone. The drone may need maintenance related to its batteries or power pack, sensors, mechanical or electrical components, firmware and the like. In an example embodiment, the drone may be capable of autonomously retooling its components at the docking station.

Command and Control

The drone may be in communication with a computational device (for e.g., device 420) that acts as a command center. The command center may be in communication with multiple drones that are autonomously navigating the facility or that are in standby mode at a docking station. The communication module 160 may the facilitate communications between the command center and a drone. The command center may facilitate communications between drones, or the drones may communicate to one another directly.

In one embodiment the drone is expected to be in constant communication with the command center. However, if the communication link is lost or weak, an alert may be generated at the command center, and appropriate steps may be taken to re-establish communication. While the drone may make autonomous decisions in response to detected circumstances, the command center may also transmit commands to the drone to redirect the drone based on data detected by the drone or based on data only available to the command center. For example, the command center may have received data from another drone at the outdoor facility that may require redirection of the instant drone during its autonomous navigation of the outdoor facility. Another drone may report a crash or obstacle that is undetectable by the instant drone due its location at the outdoor facility. The command center may transmit commands to the instant drone to dynamically reroute the drone to avoid the crash or obstacle.

In an example embodiment, the command center may autonomously transmit flight commands to the drone based on a pre-generated route. A route may be generated based on selection of a start point and end point by a user. The command center may generate directions to follow the route, and then convert the directions to command instructions comprehensible by the drone.

The command center may also instruct the drone to monitor, capture, and store images or video, and log statistics and data during its navigation of the outdoor facility. The command center may control how often the drone transmits the collected data to a server or to the command center. The command center may instruct the drone to upload its data based on various factors, such as time spent in flight, memory capacity of the drone, occurrence of a dynamic event, and the like.

Sensors and Technology for Localization and Obstacle Detection

Various sensors and systems may be used to sense, detect and collect data using the drone during navigation of the outdoor facility. Some of the data collected by the drone is location data that aids in determining where the drone is located in the outdoor facility.

In one embodiment a smart lighting system is used by the drone for detecting landmarks and static objects in the outdoor facility. In this embodiment, a light, for example a light-emitting diode (LED), may be disposed at particular landmarks and static objects. The light may be of a particular color or may emit a particular wavelength that when sensed by the drone allows for identification of the drone's location (by the drone or the command center).

In one embodiment the drone is coupled with thermal scanners to enable the drone to detect personnel, equipment (that produce heat in idle mode or operating mode), or other heat generating objects.

Figure 5:
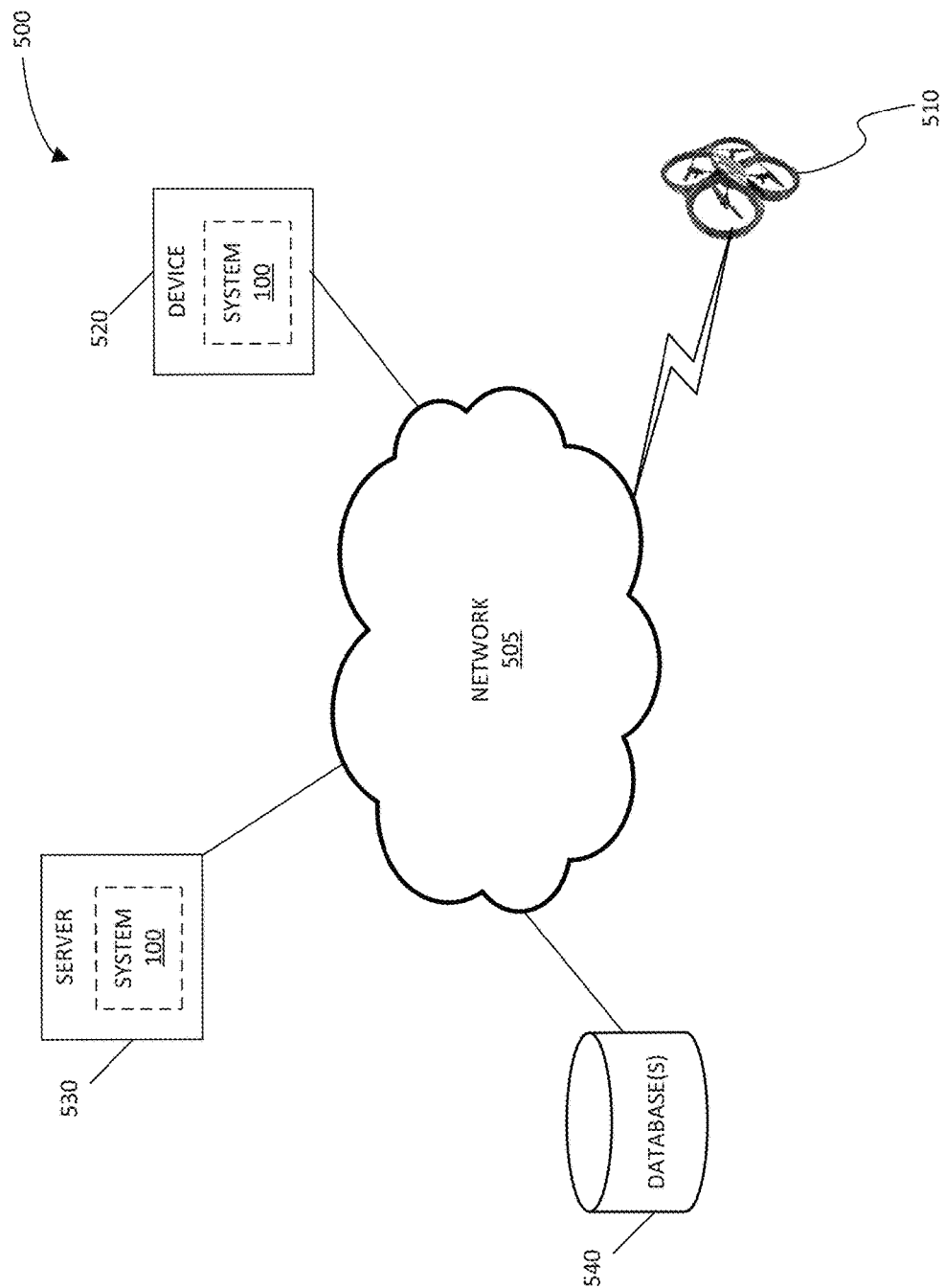
FIG. 5 illustrates a network diagram depicting a system for implementing the drone system, according to an example embodiment.

FIG. 5 illustrates a network diagram depicting a system 500 for implementing the drone navigation system, according to an example embodiment. The system 500 can include a network 505, a drone 510, a device 520, a computing system such as server 530, and database(s) 540. Each of components 510, 520, 530, and 540 is in communication with the network 505. It will be appreciated that the depicted components may be combined in combinations other than those specifically illustrated herein without departing from the scope of the present invention. For example, the functionality of the device 520 and server 530 may be combined in a single computing system or device.

In an example embodiment, one or more portions of network 505 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The drone 510 may include an optical code reader or scanner, a RFID reader, a PCM or ECM data receiver, an image capturing device, such as a camera or high-definition camera to capture video, images, and/or audio data, one or more sensors, such as a motion detector, infrared sensor, thermal sensor, and the like. The drone 510 may also include a wireless communication interface or mechanism to facilitate communications with various devices, such as device 520 and/or servers, such as server 530. The drone 510 can include one or more components described in relation to drone 700 shown in FIG. 7.

The device 520 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. The device 520 can include one or more components described in relation to computing device 500 shown in FIG. 5. In one embodiment, the device 520 is a tablet computing device operated by an employee of the outdoor yard.

The device 520 may connect to network 505 via a wired or wireless connection. The device 520 may include one or more applications such as, but not limited to, the drone system 100 described herein.

In an example embodiment, some of the components of the drone system 100 may be included in the device 520, while the other components are included in the server 530. Some of the functionalities of the drone system described herein may be performed by the device 520.

Each of the database(s) 540 and server 530 is connected to the network 505 via a wired or wireless connection. The server 530 may include one or more computing devices or processors configured to communicate with the drone 510, the device 520, and database(s) 540 via network 505. The server 530 hosts one or more applications or websites accessed by the device 520 and/or facilitate access to the content of database(s) 540. Database(s) 540 include one or more storage devices for storing data and/or instructions (or code) for use by the device 520 and server 530, such as assigned locations for trucks and trailers, initial time of arrival of the truck or trailer at its current location, RFID tag assignments for a truck or trailer, PCM or ECM codes, video or image captured by the drones, map of the outdoor facility, inventory information, and the like. Database(s) 540, and/or server 530, may be located at one or more geographically distributed locations from each other or from the device 520. Alternatively, database(s) 540 may be included within server 530.

Figure 6:
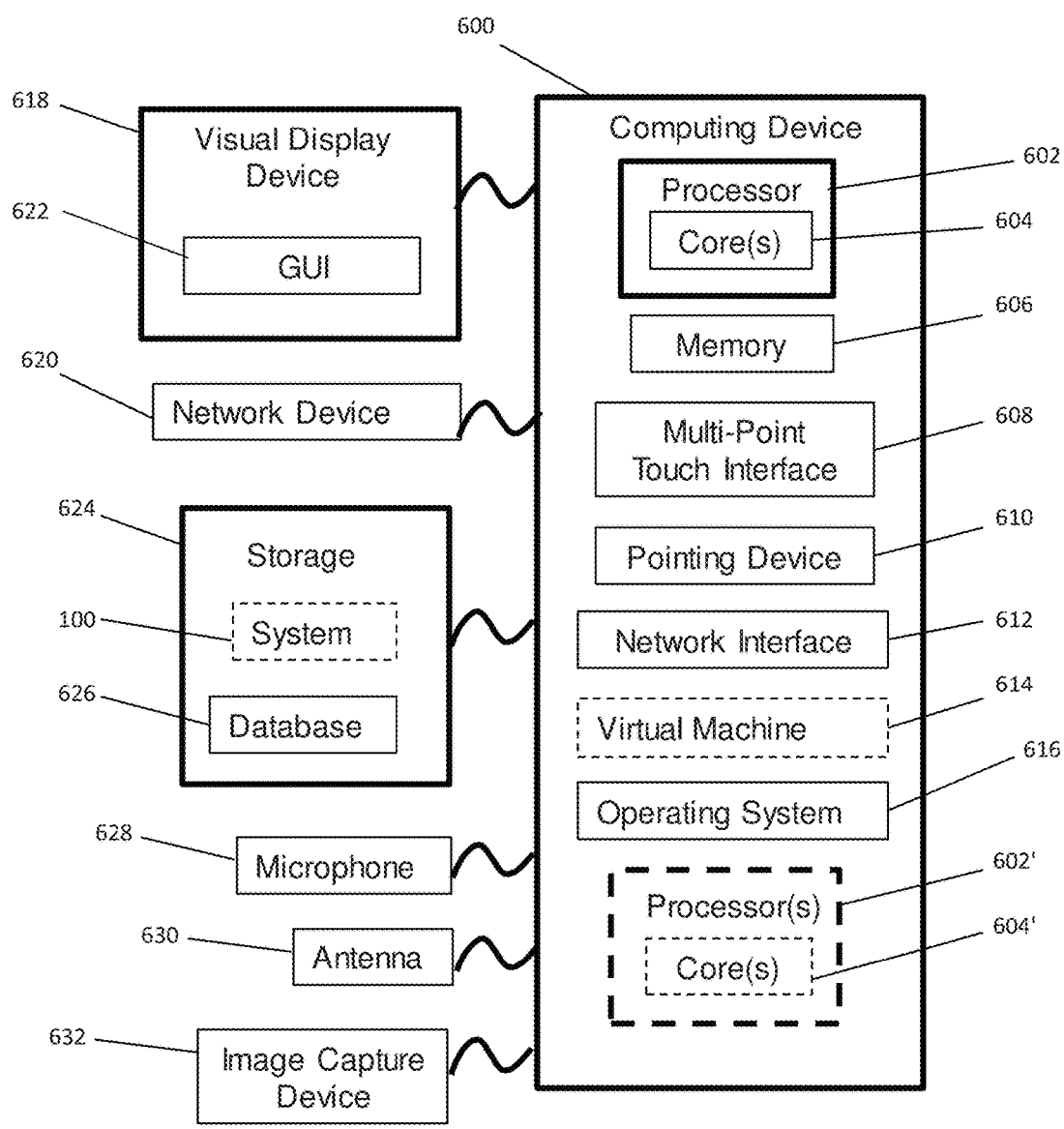
FIG. 6 is a block diagram of an exemplary computing device that can be used to implement exemplary embodiments of the drone system described herein.

FIG. 6 is a block diagram of an exemplary computing device 600 that may be used to implement exemplary embodiments of the drone system 100 described herein. The computing device 600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 606 included in the computing device 600 may store computer-readable and computer-executable instructions or software for implementing exemplary embodiments of the drone system 100. The computing device 600 also includes configurable and/or programmable processor 602 and associated core 604, and optionally, one or more additional configurable and/or programmable processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' may each be a single core processor or multiple core (604 and 604') processor.

Virtualization may be employed in the computing device 600 so that infrastructure and resources in the computing device may be shared dynamically. A virtual machine 614 may be provided to handle a process running on multiple processors so that the process appears to be using only one computing resource rather than multiple computing resources. Multiple virtual machines may also be used with one processor.

Memory 606 may include a computer system memory or random access memory, such as DRAM, SRAM, EDO RAM, and the like. Memory 606 may include other types of memory as well, or combinations thereof.

A user may interact with the computing device 600 through a visual display device 618, such as a computer monitor, which may display one or more graphical user interfaces 622 that may be provided in accordance with exemplary embodiments. The computing device 600 may include other I/O devices for receiving input from a user, for example, a keyboard or any suitable multi-point touch interface 608, a pointing device 610 (e.g., a mouse), a microphone 628, and/or an image capturing device 632 (e.g., a camera or scanner). The multi-point touch interface 608 (e.g., keyboard, pin pad, scanner, touch-screen, etc.) and the pointing device 610 (e.g., mouse, stylus pen, etc.) may be coupled to the visual display device 618. The computing device 600 may include other suitable conventional I/O peripherals.

The computing device 600 may also include one or more storage devices 624, such as a hard-drive, CD-ROM, or other computer readable media, for storing data and computer-readable instructions and/or software that implement exemplary embodiments of the drone system 100 described herein. Exemplary storage device 624 may also store one or more databases for storing any suitable information required to implement exemplary embodiments. For example, exemplary storage device 624 can store one or more databases 626 for storing information, such as a map of the outdoor facility, route instructions for the drone 610, assigned location of trucks and trailers, and/or any other information to be used by embodiments of the system 100. The databases may be updated manually or automatically at any suitable time to add, delete, and/or update one or more items in the databases.

The computing device 600 can include a network interface 612 configured to interface via one or more network devices 620 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 600 can include one or more antennas 630 to facilitate wireless communication (e.g., via the network interface) between the computing device 600 and a network. The network interface 612 may include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 may be any computer system, such as a workstation, desktop computer, server, laptop, handheld computer, tablet computer (e.g., the iPad™ tablet computer), mobile computing or communication device (e.g., the iPhone™ communication device), point-of sale terminal, internal corporate devices, or other form of computing or telecommunications device that is capable of communication and that has sufficient processor power and memory capacity to perform the operations described herein.

The computing device 600 may run operating system 616, such as versions of the Microsoft® Windows® operating systems, different releases of the Unix and Linux operating systems, versions of the MacOS® for Macintosh computers, embedded operating systems real-time operating system, open source operating systems, proprietary operating systems, or other operating systems capable of running on the computing device and performing the operations described herein. In exemplary embodiments, the operating system 616 may be run in native mode or emulated mode. In an exemplary embodiment, the operating system 616 may be run on one or more cloud machine instances.

Figure 7:
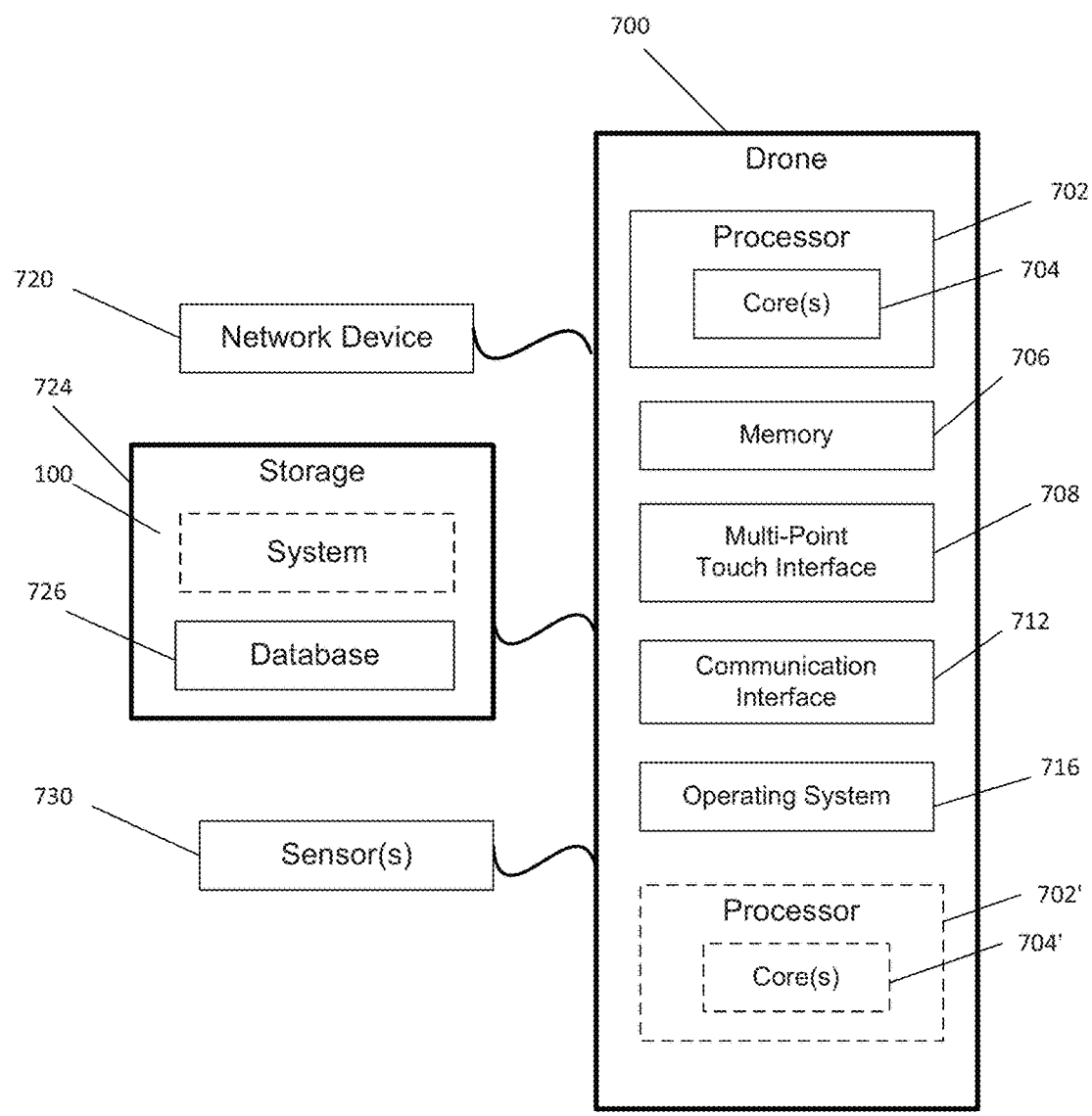
FIG. 7 is a block diagram of an exemplary drone that can be used to implement exemplary embodiments of the drone system described herein.

FIG. 7 is a block diagram of an exemplary drone 700 that may be used to implement exemplary embodiments of the drone system 100 described herein. The drone 700 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 706 included in the drone 700 may store computer-readable and computer-executable instructions or software for implementing exemplary embodiments of the drone system 100. The drone 700 may also include configurable and/or programmable processor 702 and associated core 704, and optionally, one or more additional configurable and/or programmable processor(s) 702' and associated core(s) 704' (for example, in the case of the drone having multiple processors/cores), for executing computer-readable and computer-executable instructions or software stored in the memory 706 and other programs for controlling the drone hardware.

Processor 702 and processor(s) 702' may each be a single core processor or multiple core (704 and 704') processor. Memory 706 may include a computer system memory or random access memory, such as DRAM, SRAM, EDO RAM, and the like. Memory 706 may include other types of memory as well, or combinations thereof.

The drone 700 may also include one or more storage devices 724, such as a hard-drive, CD-ROM, or other computer readable media, for storing data and computer-readable instructions and/or software that implement exemplary embodiments of the drone system 100 described herein. Exemplary storage device 724 may also store one or more databases for storing any suitable information required to implement exemplary embodiments. For example, exemplary storage device 724 can store one or more databases 726 for storing information, such as route instructions, sensed data, scanned data including identifiers, and other data to be used by embodiments of the system 100. The databases may be updated manually or automatically at any suitable time to add, delete, and/or update one or more items in the databases.

The drone 700 may be coupled to one or more sensors 730. The sensors may include, but are not limited to, location sensors, optical code sensors, RFID readers, infrared sensors, distance sensors, motion detectors, thermal sensors, and the like.

The drone 700 can include a communication interface 712 configured to interface via one or more network devices 720 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the network interface 712 may include a built-in network adapter, network interface card, PCMCIA network card, card bus network adapter, wireless network adapter, USB network adapter, modem or any other device suitable for interfacing the drone 700 to any type of network capable of communication and performing the operations described herein. Moreover, the drone 700 may be any computer system, or other form of computing or telecommunications device that is capable of communication and that has sufficient processor power and memory capacity to perform the operations described herein.

The drone 700 may run operating system 716, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device and performing the operations described herein. In exemplary embodiments, the operating system 716 may be run in native mode or emulated mode. In an exemplary embodiment, the operating system 716 may be run on one or more cloud machine instances.

The following description is presented to enable any person skilled in the art to create and use a computer system configuration and related method and article of manufacture for a drone system for checking outdoor inventory. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A drone system comprising:
  a drone configured for navigation of an outdoor facility and equipped with:
    an RFID reader,
    an optical code reader and,
    at least one of a powertrain control module (PCM) data receiver and electronic control module (ECM) data receiver; and
  a computing system in communication with the drone and configured to execute:
    a security module, and
    an analysis module,
  wherein the outdoor facility houses a plurality of trucks and a plurality of trailers and the drone is configured to:
    operate the RFID reader to read an RFID tag affixed to a selected truck or a selected trailer to determine a first identifier or operate the optical code reader to read a second identifier for the selected truck or selected trailer,
    receive data at the PCM data receiver from a PCM installed in the selected truck or the selected trailer or receive data at the ECM data receiver from an ECM in the selected truck or the selected trailer, the data received at the PCM data receiver or the ECM data receiver including an error code, and
    transmit the first or second identifier, the received data and a location of the selected truck or the selected trailer in the outdoor facility to the computing system, and
  wherein the computing system is further configured to:
    process the received PCM or ECM data with the analysis module to determine a status of the selected truck or the selected trailer, and
    process the first or second identifier and the location received from the drone with the security module to verify an assigned location for the selected truck or the selected trailer.

2. The drone system of claim 1, wherein the drone is coupled to an image capturing device.

3. The drone system of claim 2, wherein the drone is configured to execute the image capturing device to obtain images of a security seal on at least one of the selected truck and the selected trailer.

4. The drone system of claim 2, wherein video analytics are applied to the images to detect a break of the security seal.

5. The drone system of claim 2, wherein the images obtained by the drone are transmitted to the computing system and the analysis module is configured to detect damage to the selected truck or selected trailer in the outdoor facility by applying video analytics to the images.

6. The drone system of claim 1, wherein the drone is configured to:
  retrieve an initial time at which an identified truck among the plurality of trucks or an identified trailer among the plurality of trailers arrived at a current location in the outdoor facility,
  identify a current time for the identified truck or the identified trailer at the current location to determine an elapsed parked time for the identified truck or the identified trailer at the current location, and
  transmit an alert to the computing system when the elapsed parked time is greater than a pre-determined threshold.

7. The drone system of claim 1, wherein the drone is configured for autonomous navigation of the outdoor facility based on a predefined route.

8. The drone system of claim 7, wherein the drone is configured to deviate from the predefined route when the drone detects a predefined event.

9. A method for a drone system comprising:
  configuring a drone for navigation of an outdoor facility, the drone equipped with an RFID reader, an optical code reader and, at least one of a powertrain control module (PCM) data receiver and electronic control module (ECM) data receiver;
  operating the RFID reader at the drone to read an RFID tag affixed to a selected truck or a selected trailer to determine a first identifier or operating the optical code reader to read a second identifier for the selected truck or selected trailer;
  receiving data at the PCM data receiver from a PCM installed in the selected truck or the selected trailer or receive data at the ECM data receiver from an ECM in the selected truck or the selected trailer, the data received at the PCM data receiver or the ECM data receiver including an error code;
  transmitting the first or second identifier, the received data and a location of the selected truck or the selected trailer in the outdoor facility to a computing system in communication with the drone and configured to execute a security module and an analysis module;
  processing the received PCM or ECM data with the analysis module to determine a status of the selected truck or the selected trailer; and processing the first or second identifier and the location received from the drone with the security module to verify an assigned location for the selected truck or the selected trailer.

10. The method of claim 9, wherein an image capturing device is coupled to the drone.

11. The method of claim 10, further comprising:
executing the image capturing device coupled to the drone to obtain images of a security seal on at least one of the selected truck and the selected trailer.

12. The method of claim 10, further comprising:
applying video analytics to the images to detect a break of the security seal.

13. The method of claim 10, further comprising:
transmitting the images obtained by the drone to the computing system; and
detecting, at the analysis module, damage to the selected truck or selected trailer in the outdoor facility by applying video analytics to the images.

14. The method of claim 9, further comprising:
retrieving an initial time at which an identified truck among the plurality of trucks or an identified trailer among the plurality of trailers arrived at a current location in the outdoor facility;
identifying a current time for the identified truck or the identified trailer at the current location to determine an elapsed parked time for the identified truck or the identified trailer at the current location; and
transmitting an alert to the computing system when the elapsed parked time is greater than a pre-determined threshold.

15. The method of claim 9, wherein the drone is configured for autonomous navigation of the outdoor facility based on a predefined route.

16. The method of claim 15, wherein the drone is configured to deviate from the predefined route when the drone detects a predefined event.

* * * * *